United States Patent [19]
Kitz et al.

[11] Patent Number: 5,656,172
[45] Date of Patent: Aug. 12, 1997

[54] PH MODIFICATION OF GEOTHERMAL BRINE WITH SULFUR-CONTAINING ACID

[75] Inventors: Kevin R. Kitz, Makati, Philippines; Darrell L. Gallup, Santa Rosa, Calif.

[73] Assignee: Union Oil Company of California, El Segundo

[21] Appl. No.: 581,650

[22] Filed: Dec. 28, 1995

[51] Int. Cl.$^6$ .................................................. C02F 5/08
[52] U.S. Cl. .................... 210/696; 60/641.2; 60/641.5; 166/310; 210/743; 210/747; 210/698
[58] Field of Search .................... 60/641.2, 641.5; 210/696–698, 743, 747; 166/300, 310

[56] References Cited

U.S. PATENT DOCUMENTS

| | | | |
|---|---|---|---|
| 4,244,190 | 1/1981 | Leiffers | 60/641 |
| 4,500,434 | 2/1985 | Jost et al. | 210/698 |
| 4,830,766 | 5/1989 | Gallup et al. | 252/8.552 |
| 4,844,162 | 7/1989 | Maassen et al. | 166/267 |
| 5,028,340 | 7/1991 | Gallup | 210/753 |
| 5,073,270 | 12/1991 | Gallup et al. | 210/698 |
| 5,085,782 | 2/1992 | Gallup et al. | 210/696 |
| 5,098,578 | 3/1992 | Gallup | 210/696 |
| 5,190,664 | 3/1993 | Gallup et al. | 210/696 |

OTHER PUBLICATIONS

Hirowatari et al., *Production of Sulfuric Acid From Geothermal Power Station Exhausted Gas for Use in Scale Prevention*, Research Laboratory of Kyushu Electric Power Co. Inc., Japan and Chemical Laboratory of Mitsubishi Heavy Industries, Ltd., Japan, pp. 2445–2450. (Orally presented in Italy in Jun., 1995; Published Aug., 1995).

*Primary Examiner*—Peter A. Hruskoci
*Attorney, Agent, or Firm*—Gregory F. Wirzbicki; Alan H. Thompson

[57] ABSTRACT

Sulfur-containing acid is produced at a geothermal energy source from hydrogen sulfide produced as part of a geothermal process and introduced into aqueous liquid brine to lower the pH of the liquid brine. The lowered pH of the brine inhibits silica, metal sulfide and/or calcite formation on the surfaces of geothermal energy processing equipment or in subterranean formations in which the brine is injected.

63 Claims, 2 Drawing Sheets

PH MODIFICATION OF GEOTHERMAL BRINE WITH SULFUR-CONTAINING ACID

FIELD OF THE INVENTION

This invention relates to the treatment of a hot aqueous brine solution from a geothermal reservoir. The brine contains non-condensable gases and various dissolved components which may have scaling and corrosive tendencies. More particularly, the invention relates to a treatment of a high-enthalpy geothermal brine generally having more than a saturated concentration of ions that will produce a precipitate. The treated brine is typically reinjected back into the geothermal reservoir.

BACKGROUND

In general, processes by which geothermal brine can be used to generate electric power have been known for some time. Geothermal brine from a producing well can be flashed from the reservoir to a reduced pressure to convert some of the geothermal brine into steam, e.g., a flash-condensing process. Steam produced in this manner is generally used in conventional steam turbine-type power generators to generate electricity.

The remaining geothermal brine still contains significant energy. The two most common ways of capturing the remaining energy are to flash the brine again for use in a steam turbine or to pass the brine in a closed-loop, binary fluid system in which a low-boiling point, secondary liquid (such as a hydrocarbon) is vaporized by the hot brine, e.g., a binary fluid system. The vapor produced from the secondary liquid is then used in a separate turbine-generator to generate electricity. The vapor from the turbine is recondensed and reused. Frequently, however, the brine cannot be further used because of problems with scaling.

Regardless of whether the brine is used for additional power generation, the geothermal brine is most commonly reinjected into the ground through a "reinjection well" for one or more reasons, such as replenishing the aquifer from which the brine was extracted, preventing ground subsidence, and minimizing the environmental impact of geothermal energy production.

Geothermal brines generally contain a high concentration of dissolved salts. In addition to being highly saline, most geothermal brines contain significant concentrations of non-condensable gases, such as hydrogen sulfide, carbon dioxide, ammonia, and the like. In some localities such gases, particularly hydrogen sulfide and ammonia, must be abated to comply with environmental restrictions. Abatement methods can be very expensive.

The solubility of most dissolved ions in geothermal brine decreases with a decrease in brine temperature. Consequently, when a significant reduction in the brine temperature occurs or a loss of water due to a secondary flash occurs, supersaturation and precipitation of a portion of these supersaturated ions can result. Precipitates can combine and deposit as a scale on any solid surface with which they come into contact, such as a vessel, pipeline, or well in which the brine is confined. Scaling of the rock formation in the vicinity of the wellbore is also a well-documented occurrence.

As discussed by Bowen and Groh ("Energy Technology Handbook," D. M. Considine, Editor, at page 7-4 of Chapter 7 entitled "Geothermal Energy", incorporated by reference herein), liquid-dominated geothermal brine reservoirs may be conveniently divided into two types: one type having high-enthalpy fluids above 200 calories/gram; and one having low-enthalpy fluids below this point. High temperature type brines (i.e., high-enthalpy brines) have been defined by in-situ reservoir temperatures, the high temperature type having in-situ temperatures generally above 180° C., typically above 200° C., most commonly above 220° C., whereas the low temperature type (i.e., low-enthalpy brines) have temperatures below these values. The high-enthalpy brines especially tend to dissolve reservoir rock or other contacted solids, and these brine types contain dissolved solids (and ions) in concentrations ranging from around 2,000 to as much as 260,000 ppm by weight.

Especially troublesome dissolved solid components of the geothermal brines are silicon-containing, metal sulfide and/or calcium carbonate precursors, which may be found at or near saturation concentrations in the form of oligomers or polymers of silicic acid, sulfide, iron or manganese, and calcium and carbonate or bicarbonate ions, respectively. Depending on the particular geothermal brine, such species may precipitate from the liquid brine at almost every stage of brine processing as the temperature is lowered, for example, as relatively pure silica or calcite, as a tightly adherent metal-silica/metal-silicate scale, as other solidified silicon-containing components, or as mixed metal-carbonate scale. The precipitation tendency of silica and silicates and metal sulfides increases as lower brine temperatures are reached during the cooling process. The tendency to form calcite-rich scales increases at high temperatures, particularly in producing wells. Unless the scaling tendency of saturated brine is inhibited, naturally occurring silica-rich and/or calcite-rich and/or metal sulfide-rich scale/precipitation must be frequently removed.

High enthalpy brines typically have larger concentrations of dissolved solids than low enthalpy brines. The removal of larger amounts of heat and steam therefore produce significant levels of supersaturation and faster precipitation kinetics. These brines therefore tend to produce copious quantities of scale which can foul or plug conduits, heat-exchangers, vessels, injection wells, and/or the subterranean formation in the vicinity of the immediate re-injection wells.

Because of such massive scaling, various proposals have been made to decrease the scale formation in flash-condensing or other non-heat-exchange surface equipment used in producing and handling high-enthalpy geothermal brines. In "Field Evaluation of Scale Control Methods: Acidification," by J. Z. Grens et al, Lawrence Livermore Laboratory, Geothermal Resources Council, Transactions, Vol. 1, May 1977, there is described an investigation of the scaling of turbine components wherein a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.). In the nozzles, the primary scale was heavy metal sulfides, such as lead sulfide, copper-iron sulfide, zinc sulfide and cuprous sulfide. Thin basal layers of fine-grained, iron-rich amorphous silica appeared to promote the adherence of the primary scale to the metal substrate. By contrast, the scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was dramatically reduced or eliminated.

However, such acidification, especially at a pH near 1.5, tends to significantly increase the corrosion of the brine-handling equipment. Added wall thickness or excessively costly materials of construction are often required.

Strong acid treatments can also cause other geothermal fluid handling problems, such as the introduction of corrosive oxygen into an otherwise oxygen-free brine, or the embrittlement of equipment. Another major concern is that such strong acids must be transported to the site of the geothermal power plant which is frequently located in a relatively remote region. The transportation of these strong acids on public roads increases the risk of accidental spill, injury, and property damage.

Common commercial acid treatments of geothermal brines have frequently been limited to relatively small changes in pH such as those treatments disclosed in U.S. Pat. Nos. 4,500,434, and 5,190,664, the disclosures of which are incorporated by reference herein in their entireties. In U.S. Pat. No. 4,500,434, the moderately acidified brine was flashed in a series of separators and the formation of insoluble silicon components in the brine (and on the solid container surfaces) was substantially inhibited until disposal of the brine. In U.S. Pat. No. 5,190,664, a limited amount of sulfuric acid was added to a high-enthalpy brine in a carbon steel conduit prior to the brine passing through the mild steel heat-exchanger having titanium tubes and both silica scaling and corrosion were reduced in the tubes and downstream carbon steel injection piping.

Neither of such treatments achieves the complete elimination of scale deposition on flash-condensing or heat-exchange equipment (especially silica scale), although each treatment seeks acceptable corrosion rates and significant reductions in scaling rates. Consequently, periodic cleaning of the accumulated scale is still required—which may result in partial or complete shut down of the process, with consequent undue expense and reduced power output.

While the aforementioned acidified geothermal brine and modified acidified brine treatments have met with some success in some heat-exchanger and flash-separator applications, the need exists for more cost-effective processes which allow more economical energy extraction from a great number of geothermal brines.

Accordingly, a geothermal power process utilizing a more effective acid treatment and having reduced operating expenses is desirable.

SUMMARY OF THE INVENTION

The present invention relates to the treatment of a hot aqueous brine from a geothermal reservoir using a "waste" gas from a geothermal energy production process. More particularly, the invention provides a method for using an acid produced from $H_2S$ (present as a waste product in most geothermal processes) for the treatment of geothermal brines having nearly saturated to supersaturated concentrations of ions that produce scale-forming precipitates (generally silica, metal sulfides and calcite). The invention reduces the amount of $H_2S$ which would be vented to the atmosphere or otherwise treated to produce sulfur products, while suppressing the formation of the undesirable precipitates.

In the present invention, sulfur dioxide or sulfurous acid is introduced into an aqueous geothermal brine solution to lower the pH of the brine solution. Hydrogen sulfide gas, generated from a geothermal energy source at or near the site of a geothermal energy power plant, is advantageously converted by oxidation to a gaseous mixture containing a majority of sulfur dioxide gas. Preferably, the hydrogen sulfide is essentially completely oxidized to sulfur dioxide at a minimum temperature of about 650° C. In one embodiment, the "site-produced sulfur dioxide" is introduced directly into the brine solution, and in another embodiment is mixed with available water at the site to produce "site-produced sulfurous acid." (Reference herein to either embodiment is expressed as "site-produced sulfur dioxide/sulfurous acid.")

The site-produced sulfur dioxide/sulfurous acid is added to the brine solution in sufficient concentration to modify the pH and reduce or essentially eliminate the precipitation of silicon-containing, metal sulfide and/or calcium carbonate-containing solids that form scale on the surfaces of geothermal energy processing equipment and/or plug reinjection wells. In addition, the mildly acidic nature of the site-produced sulfur dioxide/sulfurous acid results in lower corrosion rates for metal-containing processing equipment. Furthermore, it has been discovered that the sulfite and/or bisulfite anions supplied to the brine solution from sulfurous acid effect greater solubilization (and complexing) of the silicon-containing components of the brine than do sulfate anions. Surprisingly, the bisulfite-silicic acid complex is typically at least twice as strong, and in some cases at least four or five times as strong, as a comparable sulfate-silicic acid complex.

The on-site production of the sulfur-containing acids from a readily available source of hydrogen sulfide, contained in or derived from the geothermal energy source, avoids the economic disadvantage of transporting considerable quantities of acid-containing pH modifiers over great distances to remotely located geothermal power facilities (which must, in many cases, be situated at or near the remotely located geothermal source of energy). It is also environmentally advantageous to eliminate the hazard of transporting acid over long distances on public roads. Thus, it is highly desirable to treat geothermal energy sources having a significant hydrogen sulfide gas content in accordance with the present invention.

BRIEF DESCRIPTION OF THE DRAWINGS

The present invention will be more readily understood by reference to the drawing of FIG. 1 which depicts, in simplified form, relevant portions of a geothermal brine production well and power plant, including a flash-condensing operation and/or heat recovery operation, an on-site unit for conversion of hydrogen sulfide to sulfur dioxide, and/or an on-site unit for conversion of sulfur dioxide to sulfurous acid, with which the pH modification method of the present invention may be used to advantage.

The drawing in FIG. 2 depicts an exemplary geothermal fluid production well and power plant, including both a flash-condensing operation and a binary fluid operation. A direct contact steam condenser in the flash-condensing operation provides hydrogen sulfide for an incineration process and a sulfur dioxide scrubber collects sulfur-containing acid for transport to geothermal fluids or brine in either the binary fluid operation or the flash-condensing operation.

DETAILED DESCRIPTION OF THE INVENTION

Prior geothermal brine processing schemes extract energy from hot, pressurized geothermal brines by passing them through such industrial equipment as flash vessels or heat-exchangers. In producing and utilizing such hot pressurized aqueous brine solutions, a portion of the dissolved metal salts (particularly silicon-containing, metal sulfide and/or calcite salts) at or near their saturation concentration can precipitate and deposit as scale on the surfaces of the vessel or conduit confining the brine. Examples of hot pressurized aqueous brine solutions treated in the present invention include both geothermal fluids containing a mixture of brine, steam and non-condensable gases, and single-phase geothermal aqueous brines, used in a wide variety of industrial operations. Highly specific examples of high-enthalpy brines containing silicon and/or calcium components are found in Bulalo, Tiwi, Leyte (including Tonganan, Malikbok and Mahongandong), Bac-Man, and Palinpinon in the Philippines; Brawley, Heber, Coso and Salton Sea localities in California; and Awibengkok and other locations in Indonesia.

The primary reason for limiting the extraction of heat in such industrial equipment is the very rapid precipitation of dissolved silicon-containing, metal sulfide-containing and/or calcium carbonate-containing (e.g., calcite) brine components and the subsequent fouling of the surfaces of the processing equipment which reduces the efficiency of heat-exchanger, and restricts the flow of brine through other process equipment. Removing such scales is very expensive, both in the physical cleaning process and in the disposal of the scales, which is frequently hazardous. The flow restrictions caused by the scale can reduce the output of the plant and force shutdowns which cause revenues to decrease or stop.

The aqueous geothermal fluids or brines treated in the present invention can contact surfaces to form a number of different types of scale that foul processing equipment or plug geothermal reinjection wells and the surrounding formation. Such scales can be inhibited from forming in the method of the invention, depending on the nature and concentration of the ions and/or metal salts in solution. The scale-forming calcite, metal sulfide and silicon-containing precipitates that foul industrial geothermal processing equipment are typically derived from calcium carbonate-forming components, metal sulfide-containing components and/or silicon-containing components of the geothermal fluid or geothermal brine. Such silicon-containing components usually include silicic acid, polymers of monomeric silicic acid, oligomers of silicic acid, and silicates; such calcium carbonate-forming components include calcium cations, carbonate and bicarbonate anions, and carbon dioxide-derived components; and such metal sulfide-forming components include lead sulfide, iron sulfide, zinc sulfide, copper sulfide and the like. The silicon-containing, metal sulfide-forming and calcium carbonate-forming components of the geothermal fluid are capable of precipitation and can form scale containing metal silicates and/or polymers containing crystalline or amorphous silicas, metal sulfides, and/or calcite or calcite-related products. In the present invention, it is preferred to inhibit silica polymerization, metal silicate formation (particularly crystalline and amorphous silicas, and aluminum-, magnesium- and iron-silicates), metal sulfide formation, and calcite formation by solubilizing the silicon-containing, metal sulfide-forming, and calcite-forming components of the brine or geothermal fluid (e.g., by forming soluble complexes).

Many of these scales are soluble in an acid solution, i.e., a solution having a pH below 7.0. However, due to the high temperature of the brine, e.g., 120° to 275° C., particularly high-enthalpy brines, and the fact that the confining vessels and conduits are generally of an iron metal, the addition of acid into the system results in corrosion of the metals. While corrosion inhibitors are known for most acids, these inhibitors do not function well under the severe temperature conditions of many systems. Thus, the use of acid to dissolve such scale has been limited in such systems and has most often been confined to systems employing corrosion resistant, but expensive, metals rather than the iron metals found in most industrial equipment.

In the present invention the fouling, plugging and corrosion problems encountered by passing acidized geothermal brines through flashing vessels, heat-exchangers, and/or reinjection wells are overcome by mildly acidizing the brine with a sulfur-containing acid which advantageously is produced at or near the geothermal energy source and/or the geothermal power plant.

In the invention, the pressurized geothermal brine or fluid is normally flashed to release steam and non-condensable gases. The mixture of steam and non-condensable gases is passed through a condenser (typically a direct contact or surface condenser) which is usually part of a condensing turbine or a heat recovery condenser. In any event, the resultant gaseous mixture passed from the condenser contains a relatively low percentage of water vapor and a relatively high percentage of the non-condensable gases, e.g., carbon dioxide, hydrogen sulfide, methane, hydrogen, ammonia, and others. A portion of the $H_2S$ in the non-condensable gas is neither released to the atmosphere, nor abated using known conversion technologies such as incineration, Lo-Cat, the Stretford process, and the like. Whether the hydrogen sulfide is flashed with steam or derived from liquid brine or condensate, the majority of the hydrogen sulfide gas is typically not abated-it is utilized as the sulfur source for the production of sulfur dioxide. The $SO_2$ can then be converted, on-site, to sulfurous acid-which, when mixed in proper proportions with the brine, lowers the pH of the brine, inhibits or substantially reduces the formation of scale, scavenges dissolved oxygen and/or reduces trivalent metal ions in the brine [(e.g., ferric iron and manganese (III)].

In the invention, hydrogen sulfide gas is separated from steam, brine, geothermal fluid, condensate, and the like, preferably at the geothermal energy processing site, and is oxidized to sulfur dioxide gas (i.e., site-produced sulfur dioxide). Several well known processing methods, catalyzed or uncatalyzed, can be employed to convert $H_2S$ to $SO_2$, e.g., incineration or oxidation burning (such as the combustion employed in the RT-2 process by Dow), vanadium catalyzed oxidation (such as the process described in U.S. Pat. No. 4,092,404), bismuth catalyzed oxidation (such as the process described in U.S. Pat. No. 4,012,486), zinc titanate adsorption (General Electric Environmental Services, Inc. or "Geesi"), and the like. In several cases, the hydrogen sulfide is converted to elemental sulfur, such as by Sulfurox, Lo-Cat, Selectox, Stretford, Claus-type processes, and the like, and then the elemental sulfur is incinerated or oxidized to sulfur dioxide. In the $H_2S/SO_2$ conversion units described herein, any process converting the sulfur contained in hydrogen sulfide to sulfur species having an oxidation number of zero or higher can be utilized (in one or more reaction steps).

If simple incineration or oxidation processes are used, in most cases, they are not catalyzed. The essentially complete oxidation (i.e., 100% oxidation efficiency) of hydrogen sulfide to sulfur dioxide is generally effected at a minimum temperature above 600° C., normally at a temperature above about 645° C., and most preferably at a temperature above about 650° C.

One embodiment of the present invention involves transporting the site-produced sulfur dioxide (often compressed $SO_2$) to a location at the geothermal energy-producing site, e.g., geothermal power plant containing a flash-condensing and/or binary fluid system, where the sulfur dioxide can be introduced directly into the aqueous liquid brine or fluid to interact or react with the water present, thereby producing sulfurous acid in-situ in the brine or fluid. The sulfur dioxide gas is introduced into brines or fluids described herein at pressures at least or greater than the pressure exerted upon the treated brine or fluid.

In a more preferred embodiment, the sulfur dioxide gas is directly combined (ex-situ) with water or aqueous solutions available at the geothermal energy-producing site from such sources as steam condensate, local streams, etc., to form sulfurous acid. Such site-produced sulfurous acid is transported, if necessary, to a suitable location in the on-site geothermal power processing scheme and introduced into the geothermal brine or fluid. The site-produced sulfurous acid contains ionizable hydrogen as a source of hydrogen (or hydronium) cations and anions comprising sulfite and bisulfite ions, with bisulfite being the predominating anionic species The sulfurous acid, whether generated in-situ in the brine solution or ex-situ with aqueous sources in accordance with the invention, is initially introduced into the aqueous brine so as to produce an equilibrium brine containing sulfite and/or bisulfite anions that comprise greater than 90, preferably greater than 95 weight percent of the sulfur-containing species, and hydrogen (hydronium) cations that comprise greater than 90 weight percent of the ionizable hydrogen species, based on the concentration of the added sulfur-containing acid species. Due to the milder and less corrosive properties of sulfurous acid, it is preferred that essentially all the sulfur dioxide introduced into the brines or other aqueous liquids or fluids be converted to sulfurous acid, with essentially no sulfate or sulfuric acid being concurrently produced. Since one primary purpose of introducing the site-produced sulfur dioxide/sulfurous acid into the geothermal brines and fluids is to lower the pH of the treated brine, such introduction is intended to increase the concentration of hydrogen (hydronium) ions into the treated aqueous materials. If any accompanying incidental amount of sulfate anion is introduced into the treated materials, it is considered insignificant.

However, in an alternative embodiment, the site-produced sulfur dioxide can be converted to sulfur trioxide gas, by means and/or methods known to those skilled in the art, prior to contact with water or aqueous solutions. The site-produced sulfur trioxide can be introduced directly into the various aqueous brine solutions described herein in the same manner as has been disclosed herein for site-produced sulfur dioxide. Alternatively, the site-produced sulfur trioxide can be added to water (or other aqueous solutions) to form sulfuric acid which can be employed in the present invention in the same manner as that disclosed herein for sulfurous acid. Although not preferred, it is still contemplated by the present invention to combine mixtures of site-produced sulfurous acid and site-produced sulfur trioxide and/or sulfuric acid with the aqueous brines or fluids described herein. Any ratio of the sulfurous acid and sulfuric acid from 1:20 to 20:1 is contemplated in the mixtures, but generally mixtures containing at least 20, at least 35, and preferably at least 50 weight percent of the site-produced sulfurous acid is preferred.

The hydrogen (or hydronium) cations contributed to the water or geothermal brine from the site-produced sulfur dioxide/sulfurous acid lower the pH of the geothermal brine or fluid. In the present invention, the geothermal brine is typically processed to extract energy at a pH in the range from about 4.0 to about 7.0, although the pH of the brine prior to modification may be as high as 10.0 to as low as 5.0. The site-produced sulfur dioxide/sulfurous acid is usually added to the brine to lower the pH to below 7.0, normally to within the range from about 4.0 to about 6.0, and preferably to within the range from about 5.0 to about 6.0.

Scale formation from geothermal fluid or brine can be reduced, and scale previously formed can be removed, by including in the fluid or brine the site-produced species of sulfurous acid or a precursor thereof such as sulfur dioxide (although sulfuric acid or a precursor thereof such as sulfur trioxide is also useful), in an amount sufficient to inhibit formation of substantial amounts of silicon-containing, metal sulfide precipitates, and/or calcium carbonate precipitates, and to lower the pH of the fluid or brine. "Substantial" amounts of precipitates deposited on the surface of the industrial geothermal processing equipment are typically those amounts which foul the equipment, causing shut down of all or part of the process in order to remove the scale. The scales may reduce the efficiency of the process by increasing pressure drops in pipelines or decreasing heat transfer across surfaces of heat-exchangers. Substantial amounts of silicon-containing, metal sulfide, and/or calcite precipitates formed in the brine-flowing sections of the processing equipment shorten the process cycle life or increase costs of an otherwise comparable process not containing the sulfurous acid additive. Also, some corrosion of the iron metal components occurs upon the interaction of the sulfurous acid with the metallic surfaces of the industrial equipment, the industrial operation can be carried out for an appreciable length of time without scale problems before the iron metal components are corroded to the point that they must be replaced or repaired.

Other acids in addition to the site-produced sulfur dioxide/sulfurous acid may also be added to the brine, particularly when an insufficient supply of hydrogen sulfide is obtained from the power generation site at or near the geothermal energy source, e.g., a site where geothermal brine contains insufficient hydrogen sulfide for producing enough site-produced sulfur dioxide/sulfurous acid to lower the pH of the treated aqueous materials into the desired range. Either inorganic mineral acids or organic carboxylic acids may be added to the flashed or unflashed brine, including sulfuric acid, hydrochloric acid, nitric acid, acetic acid, other conventional pH modifiers, and mixtures thereof.

Aside from pH modification, the sulfurous acid also effects improved solubilization of the scale-forming solids contained in the hot or treated brines. In the invention, inhibition, reduction and/or solubilization of scale, particularly silicon-containing scale, are (is) more effectively accomplished with sufficient concentrations of sulfite and/or bisulfite anions in the brine. Such sulfite anions, and especially bisulfite anions, introduced into the brines from the site-produced sulfur dioxide/sulfurous acid or from other sources of sulfurous acid, form stronger soluble complexes with the silicon-containing components in the brine as compared to those formed with sulfate ions. For instance, a hot brine solution at pH 7 and containing saturated concentrations of dissolved monomeric silica, $Si(OH)_4$, is treated with sulfurous acid and such silica is maintained in solution consistently longer and/or at equivalent or higher concentrations than comparable concentrations of silica contained in comparable brine that is treated with sulfuric acid (having equivalent molarity to the sulfurous acid). Such a reduction in silica polymerization (and silica precipitation), due to the complexing of sulfite or bisulfite anions with silica, is surprising and unexpected, particularly when compared to the complexing of sulfate with silica.

As the pH of hot brines treated herein is decreased to pH values less than 7, 6, 5 or lower by the method of the invention, inhibition of silica precipitation with sulfite or bisulfite anions is even more pronounced. Sulfurous acid is unique in that it serves the dual function of pH modification and reduced precipitation of dissolved solids (i.e., silica-containing, metal sulfides and calcium-carbonate). Due to the added hydrogen cations and added sulfite and/or bisulfite ions there is an economic advantage of the present invention over previous methods.

Figure 1:
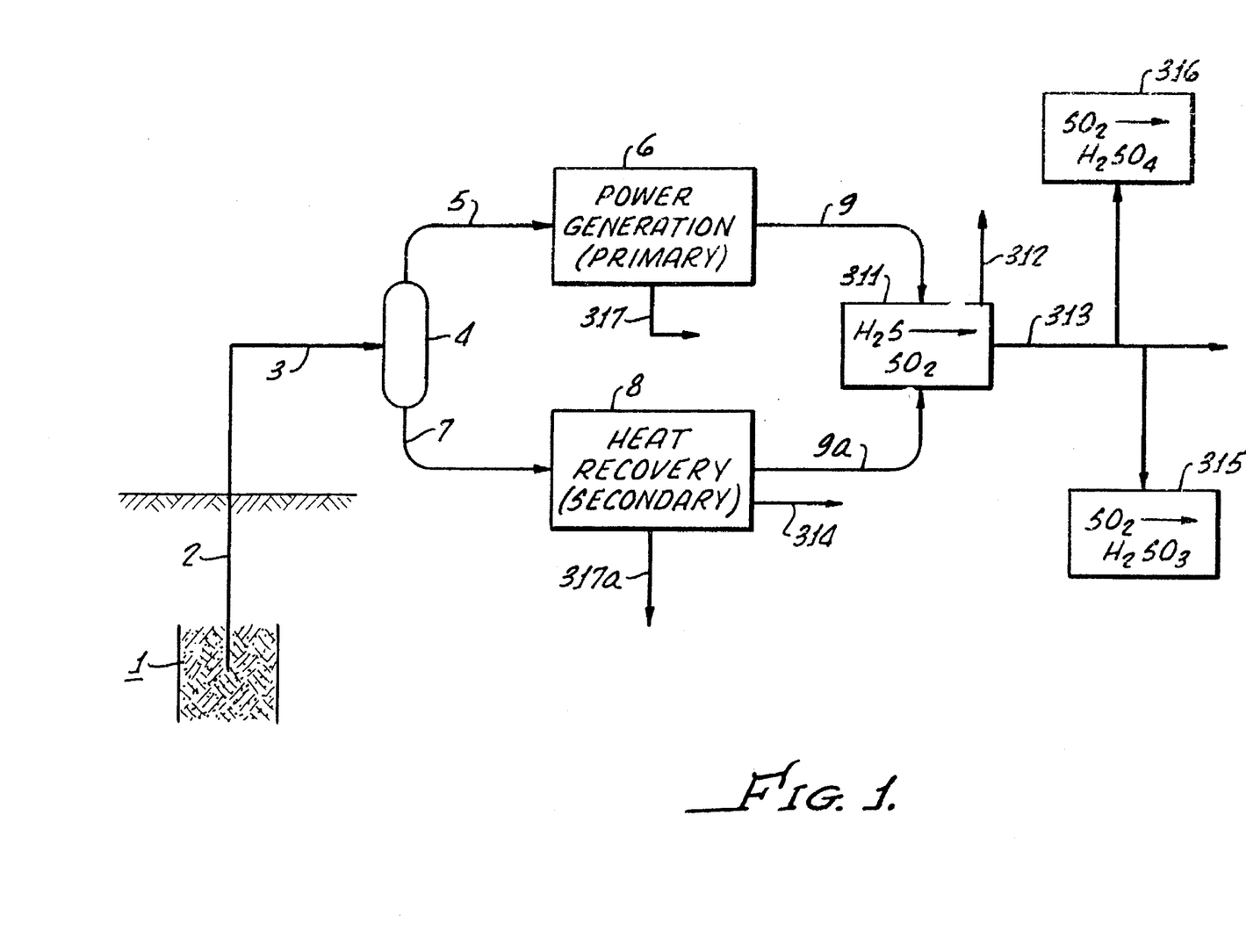

Shown in simplified form in FIG. 1 is a geothermal reservoir 1, that exists below the earth's surface and may contain a mixture of steam, brine, and various other gases including carbon dioxide, hydrogen sulfide, ammonia, and others. These fluids are produced to the surface via a production well 2. The preferred method of flowing the well is by artesian methods, in which the brine is allowed to boil in the reservoir, or somewhere within the length of the production well, resulting in a self-propelled mixture of steam, gas, and brine at the surface. In some instances the use of a wellhead pump (not shown) may be preferred, depending on characteristics of the reservoir, the chemistry of the brine, and other considerations.

In the embodiment shown in FIG. 1, the mixture of steam, gas, and brine is introduced into a separation vessel 4, by means of a conduit 3, where the steam and non-condensable gases are separated from the brine at a pressure generally in the range of 30 to 300 p.s.i.g., but most commonly from about 100 to 180 p.s.i.g. Such steam and gases are transported via conduit 5 to a primary power generation process 6, which can comprise a condensing steam turbine in which the steam is used directly to produce electrical power, or any "binary" steam power process (e.g., steam condensing heat-exchangers), in which the steam is used to exchange heat with another working fluid, the working fluid then being used to generate electrical power. In either case, the steam is eventually condensed and disposed or otherwise used through conduit 317, while the non-condensable gases pass through conduit 9 for use in the invention. The net output of the power generation process 6 is electrical power, steam condensate generally collected through conduit 317, and non-condensable gases generally collected through conduit 9, including the aforementioned carbon dioxide, hydrogen sulfide, water vapor and others, depending upon the particular geothermal fluid.

The brine from separation vessel 4 can be routed to a secondary, heat recovery process 8, via conduit 7 and a cooler brine recovered through conduit 314, while any non-condensable gases are collected through conduit 9a. The thermal energy of the brine may be captured in the secondary power generation process either by conductive cooling of the brine via a heat-exchanger utilizing a working fluid in a binary process, or by causing the brine to boil again (flashing) in order to produce a concentrated brine and additional steam for additional power. Such steam may be used in a condensing turbine or in a binary process. The concentrated brine is generally sent to a reinjection well or other means of disposal. The condensing turbines and/or binary processes within the heat recovery process 8, may be the same or different from those in the primary power generation process 6.

The non-condensable gases from the condensing turbines or steam condensing heat-exchangers in the primary and/or secondary power generation processes 6 and 8 are transported to an $H_2S$ to $SO_2$ (i.e., $H_2S/SO_2$) conversion process 311, through conduits 9 and 9a, respectively, and the cooled brine or steam condensate passed to other uses or to disposal, such as to reinjection wells (not shown) via conduits 317, 317a and 314, respectively. In $H_2S$ to $SO_2$ conversion process 311 results in at least a portion of the $H_2S$ is converted to $SO_2$. If for a particular reason it is undesirable to convert the entire gas stream in conversion process unit 311 to $SO_2$, at least a portion of the total gas flow from the energy generating process may be vented to the atmosphere or otherwise disposed of via conduit 312. Ordinarily all the $SO_2$ is sent to the herein described uses of the invention through conduit 313.

A portion of the resultant gaseous mixture from the $H_2S/SO_2$ conversion process unit may be directed to one or more of the following uses:

1) A portion of the $SO_2$ obtained via conduit 313 may be passed to sulfurous acid conversion unit 315 where it is absorbed in an aqueous medium, such as condensate from conduits 317 and 317a (processes 6 and/or 8), to brine from other portions of the process, especially from the brine discharged from secondary power process 8 through conduit 314, and to other sources of fresh or brine-containing waters, to form a sulfurous acid solution. Such sulfurous acid can then be used primarily for control of the pH of the brine or fluid (such as the brine in conduits 7 and 314 and the fluid in conduit 3).

2) A portion of the $SO_2$ in conduit 313 may be passed to sulfuric acid conversion unit 316 where it is converted by means known to those skilled in the art to aqueous sulfate, for the purpose of producing a strong acid, i.e., sulfuric acid, for use in control of the pH of the brines or fluids.

3) The $SO_2$ in conduit 313 may be compressed and transported (not shown) for injection directly into the brine or fluid, at any one or more locations, such as into conduits 3, 7, and 314, as a means of controlling pH.

4) The $SO_2$ and/or $H_2S$ gas used and/or produced in conversion process 311 may be vented to atmosphere via conduit 312, or used in a sulfur removal process, (not shown) for purposes of reducing the release of sulfur species to the environment.

To control the pH of the brine or fluid, one or more of the products from conversion units 315 and/or 316, known collectively as "site-produced acid," and/or $SO_2$ from $H_2S/SO_2$ conversion process 311 may be injected at one or more locations in the geothermal process shown in FIG. 1. The injections occur at the following (but not exclusive) strategic locations at a temperature that will minimize, inhibit, or otherwise control the formation of silicon-containing, sulfide or calcium carbonate-containing scales:

1) The site-produced acid may be injected at a down-hole location in the production well 2. The preferred injection means is by use of a "coiled tubine" injection unit (not shown), the use of which is well known to those skilled in the art.

2) The site-produced acid may be injected before or after a first separator or flash vessel through conduits 3, 7 and 314.

3) The site-produced acid may be injected into the brine within the secondary heat recovery process 8.

4) The site produced acid may be injected immediately upstream of a reinjection well which disposes the product from processes 6 and/or 8.

Figure 2:
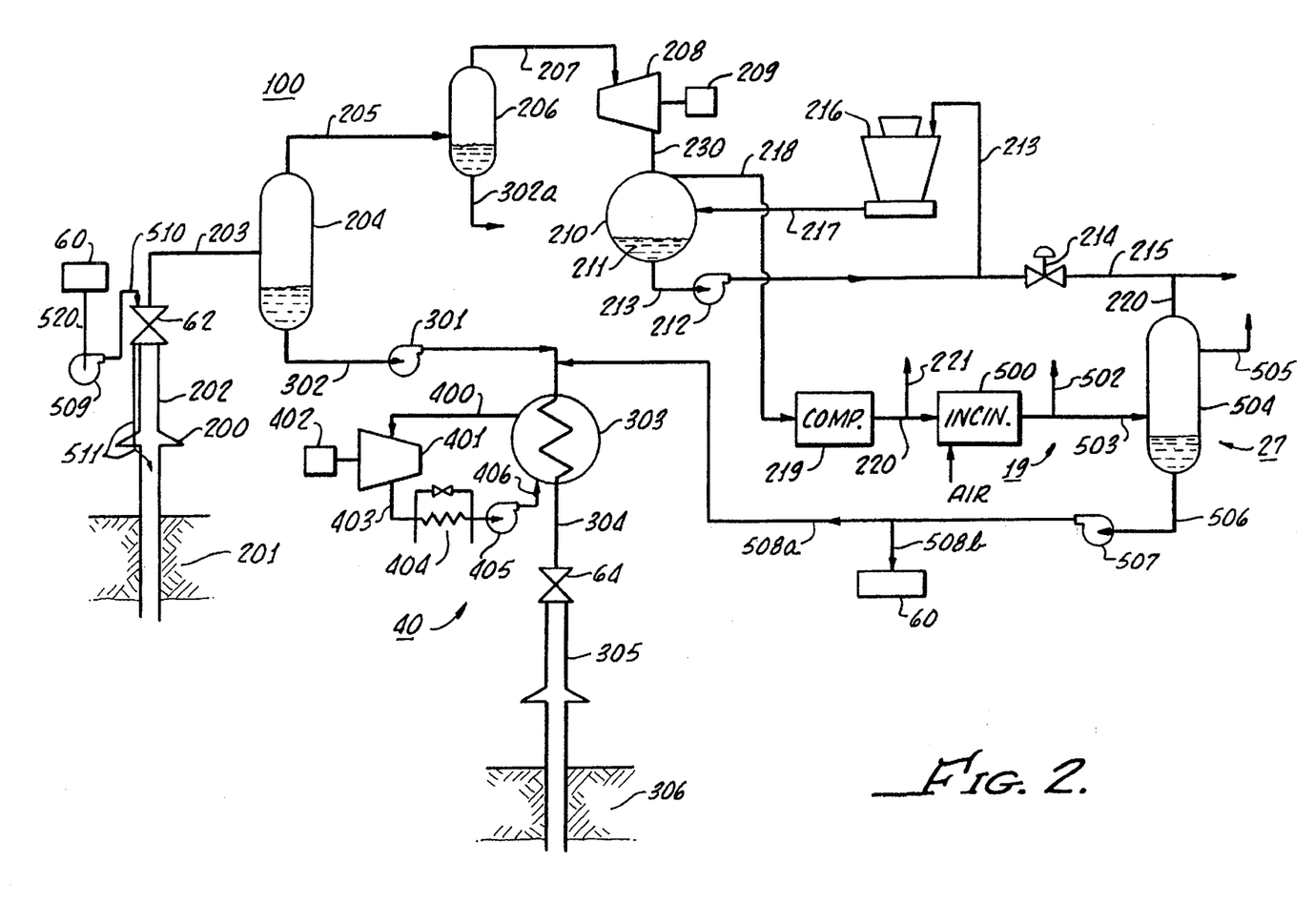

Shown in simplified form in FIG. 2 are relevant portions of an exemplary industrial geothermal processing operation involving a brine power plant 100, including an on-site means for converting gaseous hydrogen sulfide to sulfur-containing pH modifiers of the brine or fluid, i.e., sulfurous or sulfuric acid. Generally, power plant 100 is a primary power generating process including separator (flash vessel) 204, steam scrubber 206, condensing steam turbine 208 and generator 209, direct contact condenser 210, cooling tower 216, hydrogen sulfide conversion (oxidation) means 19 (including compression process 219 and incinerator 500), sulfur dioxide conversion means 27 (including sulfur dioxide scrubber 504), and a secondary heat recovery process 40, including binary fluid heat-exchanger 303, turbine 401, generator 402 and condenser 404. Associated with power plant 100, but not actually forming a part thereof, are brine production well 202 and brine reinjection well 305. Production well 202 penetrates into geothermal reservoir 201, and reinjection well 305, which is similar to production well 202, penetrating to the same geothermal reservoir 201 or into another subterranean reservoir such as 306.

The pH of the brine as it enters production well 202 from geothermal reservoir 201 is typically about 4 to about 7 and usually between about 5 and 6; however, due to eventual removal of the non-condensable gases, the pH of the brine can typically increase to between about 5 and 8. Brine temperature at geothermal reservoir 201 varies considerably from well to well, but is usually in the broad range from about 120° to 325° C., with brine temperature between about 220° and 275° C. being typical of many localities.

In operation, hot geothermal brine containing dissolved salts, including silica, non-condensable gases, and steam from geothermal reservoir 201 is introduced under pressure from production well 202 through conduit 203 into the side region of separator 204. The brine is discharged through conduit 203 into the separator, typically at a pressure within the range from about 30 to about 200 pounds per square inch gauge (p.s.i.g.) at the wellhead. Within the separator, the brine is flashed to a substantially lower pressure, such as 125 p.s.i.g., to release the steam. Within separator 204, the non-condensable gases including hydrogen sulfide, carbon dioxide and ammonia, are separated (or stripped) from the geothermal brine. These non-condensable gases and steam are discharged from the top of separator 204 through steam (and gas) conduit 205 into the steam scrubber 206 where any residual brine is removed (via conduit 302a) from the steam. The remaining cleaned steam and gases are discharged from the top of steam scrubber 206 through gas conduit 207 to condensing steam turbine 208 to drive generator 209. The gases and steam may also bypass the scrubber and be fed directly to steam turbine 208. The brine is discharged from the bottom of separator 204 and is directed through conduit 302 for further processing.

All of the condensate and/or steam is discharged from steam condensing turbine 208 through conduit 230 to the direct contact condenser 210 containing a hotwell 211. The condensate from the hotwell is ordinarily pumped (by pump 212) through conduit 213 for routing to cooling tower 216. The cooled water from cooling tower 216 flows via conduit 217 back to the contact condenser to effect the condensation of steam from the turbine. A portion of excess water from conduit 213 is passed through level control valve 214 and passed through conduit 215 to disposal or preferably through conduit 226 to the sulfur dioxide scrubber 504 of sulfur dioxide conversion means 27.

The non-condensable gases, including $H_2S$, exit direct contact condenser 210 through conduit 218 typically at below atmospheric pressure and are compressed to at least slightly above atmospheric pressure in a compression process 219, which is typically a two-stage steam jet ejector. At least a portion of the hydrogen sulfide-containing gas from compression process 219 is directed through conduit 220 to the hydrogen sulfide conversion means 19 which includes an incinerator 500. If conversion of all the hydrogen sulfide is not desired or necessary, the excess or unwanted portion can be vented to the atmosphere, converted to other forms of sulfur, or generally disposed (via conduit 221).

Air or other free oxygen-containing gas is added to incinerator 500 and mixed with the hydrogen sulfide at a sufficient temperature, using the known conversion technologies, to produce sulfur dioxide. The resultant gas mixture, typically containing a majority of $SO_2$, is passed through conduit 503 to sulfur dioxide scrubber 504 where the sulfur dioxide is mixed with excess cooling tower water from conduit 226 (normally controlled by level control valve 214) or with other available water sources (not shown), to form sulfurous acid (and under certain controlled conditions, at least some sulfuric acid). Excess combustion gas from incinerator 500 can be vented through conduit 502 or may be vented directly from the incinerator (not shown). The vented gas can alternatively be recycled to the incinerator, or introduced into the brine at one or more injection locations to produce sulfurous acid (in-situ). It is preferred that the scrubbed combustion gas obtained from scrubber 504, containing only small, incidental or essentially no amounts of hydrogen sulfide, be vented from the scrubber through conduit 505. The sulfurous acid (or sulfuric acid) accumulates in the bottom of scrubber 504 and through conduit 506 to pump 507 which distributes the sulfurous acid (or sulfuric acid) through such conduits as 508a and 508b or transported in portable tanks (such as portable tank 60) to injection points or locations for introduction into the brine or fluid for scale prevention.

The site-produced acid is preferably transported through a corrosion-resistant material comprising conduit 506, or by other means of transportation, such as portable tanks, tanker trucks, etc., for introduction into injection points in the power plant processing scheme to effectively reduce or prevent scale formation, as for example, transportation from conduit 508b to the brine in reinjection well 305, to the brine in production well 202, and/or to the brine in conduit 302 from separator 204. Of course, the sulfur dioxide gas obtained from conduits 502 or 503 from the incinerator can also be introduced directly into the brine at all such injection points disclosed herein.

In one embodiment of the invention, the portable tank 60 is used to transport the site-produced acid to production well 202. The acid in tank 60 is removed by pump 509 and pumped through conduit 510 and valve 62 into a coiled tubing injection unit 511 which carries the acid down the well to a location which is preferably below the point where the scaling begins. Since the portion of conduit 511 extending below wellhead 200 is exposed to the high temperature environment of the geothermal fluid being produced, it is preferred that conduit 520, carrying acid to pump 509 from the portable tank, and especially conduit 511 be made of corrosion resistant metal, e.g., stainless steel, Hastelloy, Inconel, or the like.

While the site-produced acid or sulfur dioxide can be injected from portable tank 60 downhole at geothermal reservoir 201 so as to lower the pH of the brine as close as practical to its origin, brine pH usually increases further as it passes through power plant 100, for example, as non-condensable gases are removed at separator 204. Thus, it is desirable to inject the site-produced acid or sulfur dioxide into the brine flow in places where substantial portions of silicon-containing and/or metal sulfide and calcium carbonate precipitates and/or significant pH increases otherwise occur. By so doing, a more uniform brine modification may be achieved or the amount of silicon component/metal sulfide component/calcium carbonate component solubilizing and/or acidizing of the brine may be varied according to the amount required at various locations.

In the binary fluid power cycle described in FIG. 2, the brine recovered from separator 204 through conduit 302 is also used to generate power in a secondary heat recovery process similar to that described in the heat recovery process 8 of FIG. 1. The brine is usually a single phase liquid, but may also be a two-phase brine and steam fluid mixture. The recovered brine is passed through conduit 302 from separator 204 to a heat-exchanger 303 at elevated temperature and pressure conditions. The brine may be pumped into the binary heat-exchanger 303 (such as by pump 301), but if the brine from separator 204 is self-flowing, pumping may not be required. The heat is extracted from the brine in heat-exchanger 303, shown schematically as a counterflow heat-exchanger, but cross-flow or other types of heat-exchangers may be used. After heat is transferred to a binary or working fluid, the cooled brine is injected via conduit 304 through valve 64 into reinjection well 305 and subterranean reservoir 306.

Heat-exchanger brine temperature typically ranges from 180° to 300° C., preferably at least 120° C., and most preferably at least 150° C. Brine pressure typically ranges from 896 kPa to 6984 kPa (130 to 1000 p.s.i.g.), preferably no less than 69 kPa (10 p.s.i.g.), and most preferably no less than 793 kPa (115 p.s.i.g.). The heat-exchanger brine outlet temperature typically ranges from 75° C. to 151° C. Total change in brine temperature across the heat-exchanger 303 for most brines typically ranges from 30° C. to 225° C., but preferably a change of at least 100° C. is desired to economically use the brine.

The non-condensable gas concentration in the brine at geothermal reservoir 201 is theoretically unlimited, but brines having a non-condensable gas content of at least 0.1 percent by weight and especially those brines having a non-condensable gas content of more than 1.0 percent by weight are typically more efficiently utilized. Preferred brines utilized in the present invention have concentrations of non-condensable hydrogen sulfide gas sufficient to provide a complete source of sulfur-containing pH modifier that can be produced at the geothermal processing site.

The binary or working fluid on the other side of the heat-exchanger surface of heat-exchanger 303 flows in a closed loop. From an initial temperature, the binary fluid is heated (by exchanging heat within heat-exchanger 303) to a higher temperature and passed via conduit 400 to a turbine 401. The heated binary fluid in the turbine 401 drives generator 402, passes through conduit 403 to be condensed (if the binary fluid is vaporized) in a condenser 404, and is finally repressurized by a feed pump 405 prior to passing through conduit 406 back to heat-exchanger 303 where it starts around the closed loop again.

The site-produced sulfur dioxide/sulfurous acid species can be introduced into the brine in conduit 302 as sulfur dioxide gas obtained from the hydrogen sulfide conversion means 19 via conduit 503 (details not shown), but preferably is introduced as sulfurous acid from the sulfur dioxide conversion means 27 via conduit 508a. Hydrogen sulfide can be converted at the processing site to the sulfur-containing pH modifiers in any manner known to one skilled in the art.

Although the addition of the site-produced sulfur dioxide/sulfurous acid to the brine in conduit 302 is shown to occur near the entry to heat-exchanger 303 (particularly to control silicon-containing scale), it may also occur at other locations such as after heat transfer in conduit 304. Another possible location is downhole at the production well (particularly when calcite-containing scale control is desired). Control of the amount of sulfur dioxide/sulfurous acid species mixed with the brine is often provided by a control valve (or metering pump), which is usually controlled by a sensor (not shown). Sensors may detect dissolved cations and anions and/or pH of the mixture. The sensor produces a control signal for the control valve based upon measured parameters. Other control parameters and locations for sensors are also possible.

The preferred process steps for using the fouling-control apparatus that introduces the site-produced sulfur dioxide/ sulfurous acid into the brine require the metal sulfide-forming, calcium carbonate-forming cations and anions, silicon-containing components and the pH of the brine to be estimated or measured at brine temperature and pressure conditions. Because of these elevated conditions and ongoing reactions, measurements may require the use of on-line devices or sampling, followed by stabilization and measurement. The brine pH typically is in the range of from 5.5 to 8.5 units, preferably in the range of from 6.0 to 8.0 units, and most preferably in the range of from 6.0 to 7.0 units. One of the advantages of the present invention is the increase in effectiveness of sulfur dioxide/sulfurous acid species for maintaining in dissolved or non-precipitated forms the silicon-containing components and/or metal sulfide and/or calcium carbonate-forming components of the brine as the pH of the brine (in the above-mentioned ranges) increases during various processing steps.

The concentration of silicon-containing components, silicon component-reactable cation(s), metal sulfide-forming, and calcium carbonate-forming ions in the feed brine may be directly measured or estimated based upon the predominant cation species, such as calcium, magnesium, iron and barium. These cations are typically found in high-enthalpy brines as silicon-containing, metal sulfide-containing or carbonate-containing precipitate. Also, other cations can react to form precipitates when exposed to carbonate or silicon-containing anions, e.g., aluminum, strontium, radium, silver and lead. One can also measure the total concentration of other anions in order to estimate potential formation of calcium carbonate and other non-silicon-containing precipitates.

The amount of silicon, including silicon-containing salts, and/or metal sulfides and calcium carbonate in the feed fluid often exceeds saturation levels at process conditions. Estimated silicon, heavy metals, sulfide, calcium and carbonate concentrations can be more than 105 percent of saturation amounts at feed brine conditions and/or more than 110 percent of saturation amounts at discharge brine conditions.

If measurement of calcium cations is used in place of total silicon measurements, measured calcium concentrations should be less than about 100 p.p.m.w., most preferably less than 60 p.p.m.w. in high-enthalpy feed geothermal brines at a temperature of approximately 177° C. (350° F.), such as found at Bulalo. If measurement of barium cations are used in place of total silicon measurements, measured barium concentrations should be less than 15 p.p.m.w., most preferably less than 10 p.p.m.w. in high-enthalpy feed geothermal brines at a temperature of approximately 177° C. (350° F.), such as found at Bulalo. The total of calcium and barium cations in the feed brine should be less than 250 p.p.m.w., most preferably less than 145 p.p.m.w. if total cation measurements are used in place of total silicon measurements.

The heat-exchanger 303 can be of various designs, the preferred being a shell-and-tube heat-exchanger. Prior use of this type of heat-exchanger for low-enthalpy geothermal fluids places the geothermal fluid on the tube side, so that fouling deposits can be more easily cleaned out, for example with traveling plugs or steam lances. Although flowing brine on the tube side is preferred, treated geothermal fluids can now be used on the shell side of this type of heat-exchanger because of the essential elimination of scale and fouling deposits. The heat-exchanger can be composed of a low alloy steel or other conventional materials.

The binary or working fluid is preferably a hydrocarbon fluid, such as pentane, isobutane or an isobutane mixture. The binary fluid can be selected to optimize cycle efficiency at brine inlet and/or brine outlet conditions.

The means for introducing the site-produced sulfur dioxide/sulfurous acid species (and other optional acid) into the brine flow can also vary. One preferred embodiment is an additive metering pump (114), controlled by a sensor and measuring device (115), such as pH measurements of the downstreambrine/acid mixture, where pH has a generally known or assumed relationship to the content of silicon and/or calcium carbonate components. However, control of the amount of the site-produced sulfur dioxide/sulfurous acid (or optional acid) may also be based upon the measured amounts of other anions in combination with the silicon, metal sulfide or calcium carbonate components in the brine flow. These measured values, along with temperature and other data, can be used to calculate saturation concentrations of brine silicon-containing components (at brine conditions from inlet to heat-exchanger discharge) and the otherwise expected amount of other anionic precipitation. The sulfur dioxide/sulfurous acid injection pump rate can then be selected to mix at a rate that will be sufficient to react with a majority of the silicon components (and other precipitable ions) in the brine flow to form soluble species without exceeding saturation amounts of the silicon (and/or metal sulfide and calcium carbonate) or lowering the pH to less than about 4.5 to 5.5 units.

Heat-exchanger fouling rates, after site-produced sulfur dioxide/sulfurous acid treatment in accordance with the invention, will be acceptable, i.e., compatible with conventional binary heat-exchange process equipment, for some high-enthalpy brines. The site-produced sulfur dioxide/ sulfurous acid species appear to simultaneously lower pH (dissolving some scaling tendencies) and also inhibit scale forming materials such as metal sulfides, calcite, silica or other silicon-containing precipitates (e.g., iron and aluminum), but in amounts which avoid calcium component supersaturation and undue corrosion. As in the earlier-described flash-condensing process, other acidifying agents can be added with the site-produced sulfur dioxide/sulfurous acid, such as sulfuric, hydrochloric, acetic, and nitric acids, with sulfuric and hydrochloric acids being preferred.

The invention satisfies the need to essentially eliminate scaling and significant fouling in silicon-containing and/or metal sulfide and calcite forming brines (particularly high-enthalpy brines) without drastic reductions in pH and associated corrosion problems. The invention allows both flash-condensing equipment (separators, flashing vessels, etc.) and binary heat-exchangers comprising commonly available materials to be used with high-enthalpy brines. This can be especially cost effective for brines having significant amounts of dissolved non-condensable gases (e.g., hydrogen sulfide in a concentration greater than about 1 p.p.m.w. of the brine) which require otherwise uneconomical gas removal or abatement. The advantages of the invention are especially derived during the treatment of geothermal brine solutions (typically pre-flash brines) containing at least 5 p.p.m.w. of $H_2S$, but normally such brines contain less than 250 ppmw, and preferably less than 100 ppmw of $H_2S$.

Alternative processing schemes of the invention are also possible. These include: combining binary and flash steps in a single vessel (e.g., placing heat-exchanger tubes near the bottom of a separator or flash vessel, using the flashed brine on the shell side to heat a binary fluid within the tubes); a series of binary heat-exchangers and heat-exchange process steps (e.g., regenerative heating of a binary fluid followed by geothermal brine heating); and the use of several different binary working fluids. Alternative process steps include: agitating or mixing the sulfur dioxide/sulfurous acid and brine mixture after addition; treating only a portion of the brine feed (e.g., treating a boundary layer of the brine which is proximate to heat-exchange surfaces); controlling the heat-exchanger brine temperature change such that significant silicon and/or other ionic supersaturation is avoided at the brine heat-exchanger outlet; and adding other acids containing anions which do not precipitate the existing amounts of cations in the brine (e.g., if other added acid is required to lower the pH of the mixture but the content of the particular anion of such acid in the brine/sulfurous acid mixture is approaching saturated values).

The invention is further described by the following examples which are illustrative of a specific mode of practicing the invention and are not intended as limiting the scope of the invention as defined by the appended claims.

EXAMPLE 1

At a geothermal power generation facility similar to that shown in FIG. 2, 110 Mwe are produced from approximately 2,000,000 lb/hr of steam. The flashed brine, 4,000,000 lb/hr, is reinjected into the ground at 177° C. (350° F.). Dissolved solid components (including silica) contained in the reinjection brine are deposited as scale in reinjection piping and wells at rates up to about 0.5 inches/year and usually greater than 0.1 inches/year. Steam utilized in this flash-condensing process contains 350 lb/hr of $H_2S$. In the direct contact condenser, approximately 230 lb/hr of $H_2S$ partitions to the vent gas and 120 lb/hr of $H_2S$ partitions to the condensate. In prior art processes, vent gas, containing $CO_2$ and $H_2S$, is typically released to the atmosphere. Hydrogen sulfide dissolved in the condensate is normally catalytically oxidized to sulfate using the process described in U.S. Pat. No. 5,028,340.

Utilizing the process of the invention, approximately 230 lb/hr of $H_2S$ in the vent gas is catalytically oxidized to approximately 440 lb/hr of $SO_2$. The resultant $SO_2$ is scrubbed with condensate to produce sulfurous acid which then injected into the brine just downstream of the primary separator or flash vessel. The pH of the injection brine upstream of the location of sulfurous acid injection is 7.0 and is relatively buffered. Upon injection of the sulfurous acid solution into the brine, such as through conduit 508a into conduit 302 in FIG. 2, the pH of the reinjection brine is reduced to 5.0. As a result of modifying the pH of the reinjection brine by sulfurous acid, scaling (particularly siliceous scaling) is reduced to rates less than 0.1 inches/ year. The total $H_2S$ abatement efficiency of the vent gas oxidation process is at least 97%, thus meeting prevailing air pollution standards.

EXAMPLE 2

Acidified brine (pH 5.0 and 177° C.) from Example 1 is processed by a binary fluid heat-exchanger. The temperature of the brine is reduced to 138° C. (280° F.) and approximately 3 Mwe is generated in the binary fluid power plant. Scaling, otherwise predicted without acid treatment to exceed 5 inches/year, is reduced by the process of the invention to ≦0.2 inches/year downstream of the heat-exchanger in the reinjection piping and in reinjection wells. For example, the site-produced sulfur dioxide/sulfurous acid generated in conversion units such as units 19 and 27, respectively, in FIG. 2 is introduced into conduits 302 and 304 to reduce scaling in reinjection well 305.

EXAMPLE 3

A hot aqueous brine solution, containing a saturated concentration of dissolved monomeric silica, $Si(OH)_4$, was treated with sulfur-containing acid in accordance with the invention and tested for silica polymerization against comparable reference brine solutions.

Aqueous brine solutions A and B, buffered to pH 7 and pH 5 with HCl, respectively, were tested for silica loss due to silica polymerization. The solution A at pH 7 initially contained a saturated monomeric silica concentration of 170 ppmw, calculated as $SiO_2$, while the buffered solution B at pH 5 was shown to initially have more silica, i.e., 180 ppmw. The increase in initial saturated silica content is the result of a reduction in silica polymerization kinetics as the pH is decreased.

Aqueous brine solutions, C and D, were prepared by treating the hot aqueous brine solution to a pH of 5 with sulfurous acid and sulfuric acid, respectively. Brine solution C contained 1.25 mM sulfite ion concentration and brine solution D contained 1.25 mM sulfate ion concentration. Surprisingly, the initial silica concentration of the sulfurous acid-treated solution C was 190 ppmw, whereas that of the sulfuric acid-treated solution D was 180 ppmw (same as solution B). Concentrations of dissolved silica were measured after 2, 8, 24, 48 and 72 hours and the results summarized in Table 1 below:

TABLE 1

CONCENTRATIONS OF DISSOLVED SILICA
$SiO_2$, ppmw

| Solution hours | A pH 7 | B pH 5 | C pH 5, $H_2SO_3$ | D pH 5, $H_2SO_4$ |
|---|---|---|---|---|
| 0 | 170 | 180 | 190 | 180 |
| 2 | 180 | 180 | 210 | 190 |
| 8 | 170 | 180 | 210 | 190 |
| 24 | 130 | 150 | 190 | 180 |
| 48 | 110 | 150 | 190 | 180 |
| 72 | 105 | 120 | 190 | 160 |

Data in Table 1 indicate that the silica-containing brine solution treated with sulfurous and sulfuric acids maintain higher concentrations of dissolved silica compared to the other brine solutions. It is surprising and unexpected that the sulfite and/or bisulfite-containing brine solution treated with sulfurous acid maintains the highest concentration of dissolved solids compared to those treated with the commonly utilized HCl and sulfuric acids.

While the preferred embodiment of the invention has been shown and described, and some alternative embodiments and examples also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method for inhibiting the formation of a silicon-containing precipitate from a geothermal fluid containing an aqueous geothermal brine solution comprising a silicon-containing component, said method comprising:

introducing sulfur dioxide into water or aqueous solution to form sulfurous acid, wherein sulfur contained in said sulfur dioxide is obtained from hydrogen sulfide contained in said geothermal fluid, and introducing said sulfurous acid into said geothermal fluid prior to said aqueous geothermal brine being passed through a geothermal flash-condensing vessel, and wherein the pH of said geothermal fluid or said aqueous geothermal brine is sufficiently lowered to inhibit formation of said silicon-containing precipitate.

2. The method of claim 1 wherein said hydrogen sulfide is oxidized in the presence of free oxygen-containing gas to produce sulfur dioxide.

3. The method of claim 1 wherein said sulfurous acid is introduced into said aqueous geothermal brine solution between a separator used in a geothermal flash-condensing process and a geothermal heat-exchanger.

4. The method of claim 1 wherein said sulfurous acid is introduced into said aqueous geothermal brine solution prior to said aqueous geothermal brine solution being passed through a heat-exchanger.

5. The method of claim 1 wherein said sulfurous acid is introduced into said aqueous geothermal brine prior to said aqueous geothermal brine solution being reinjected into a geothermal reservoir.

6. The method of claim 1 wherein said geothermal fluid comprises said geothermal brine, non-condensable gases and steam.

7. The method of claim 1 wherein said aqueous geothermal brine solution has a pH in the range from about 4.0 to about 10.0.

8. The method of claim 7 wherein said sulfurous acid is introduced in an amount sufficient to reduce said pH into the range from 4.5 to 6.0.

9. The method of claim 1 wherein said silicon-containing component is selected from the group consisting of silicic acid, oligomers of silicic acid, polymers containing silicic acid monomers, silicates and silicas.

10. The method of claim 1 wherein said sulfurous acid is introduced into a pressurized portion of said aqueous geothermal fluid before the pressure of said pressurized portion is reduced.

11. The method of claim 1 wherein said hydrogen sulfide is converted to free sulfur and said free sulfur is then converted to said sulfur dioxide.

12. The method of claim 1 further comprising flowing a mixture of said sulfurous acid and said aqueous geothermal brine solution in contact with a solid surface of geothermal processing equipment and wherein said flowing does not produce a substantial amount of said silicon-containing precipitate.

13. The method of claim 1 wherein the density of a portion of said silicon-containing precipitate is lower than the density of a silicon-containing precipitate produced without introducing said sulfurous acid into said aqueous geothermal brine solution.

14. The method of claim 1 further comprising flowing a mixture of said sulfurous acid and said aqueous geothermal brine solution in contact with a subterranean area immediately around a geothermal fluid reinjection well wherein said flowing does not produce a substantial amount of said silicon-containing precipitate.

15. The method of claim 1 wherein said silicon-containing precipitate includes a precipitate selected from the group consisting of calcium carbonate, iron sulfide, zinc sulfide, lead sulfide, copper sulfide, magnesium carbonate, aluminum carbonate, iron carbonate, magnesium silicate, aluminum silicate and iron silicate.

16. The method of claim 1 further comprising separating steam and said hydrogen sulfide from said geothermal fluid and condensing said steam to produce said water or said aqueous solution.

17. The method of claim 1 wherein saw aqueous geothermal brine solution further comprises a metal sulfide-forming component and/or a calcium carbonate-forming component, and the formation of a metal sulfide-containing and/or calcium carbonate-containing precipitate is inhibited.

18. A method for controlling the fouling of a solid heat-exchange surface exposed to a high-enthalpy geothermal fluid having silicon-containing components capable of producing a silicon-containing precipitate, said method comprising:

flashing hydrogen sulfide gas from said geothermal fluid to produce steam and a geothermal brine;

converting said hydrogen sulfide gas to a gaseous component comprising sulfur dioxide gas;

forming a fluid mixture comprising said geothermal fluid or said geothermal brine and sulfurous acid, said sulfurous acid prepared by combining said gaseous component with water, an aqueous solution, said geothermal brine or said geothermal fluid; and flowing said fluid mixture in contact with said solid heat-exchange surface and wherein the pH of said geothermal fluid or said geothermal brine is sufficiently lowered to inhibit formation of said silicon-containing precipitate.

19. The method of claim 18 which also comprises:

measuring the concentration of said silicon-containing components dissolved in said geothermal fluid;

estimating the saturated concentration of said silicon-containing components in said geothermal fluid;

measuring the pH of said geothermal fluid; and controlling the amount of said sulfurous acid or said sulfur dioxide to prevent the formation of substantial amounts of said precipitate.

20. The method of claim 19 wherein additional acid is added to said geothermal fluid in an amount sufficient to produce a pH of said fluid mixture to within the range from 4.5 to 6.5.

21. The method of claim 20 wherein said additional acid is selected from the group consisting of inorganic mineral acids, organic carboxylic acids, and mixtures thereof.

22. The method of claim 21 wherein said additional acid is selected from the group consisting of sulfuric acid, hydrochloric acid, acetic acid, nitric acid, and combinations thereof.

23. The method of claim 19 further comprising the step of flashing a portion of said fluid mixture before an additional portion of said sulfurous acid or said sulfur dioxide is added to the remaining liquid portion flowing in contact with said heat-exchange surface.

24. The method of claim 23 wherein said high-enthalpy geothermal fluid is at a pressure which maintains at least one non-condensable gas comprising $CO_2$ and/or $H_2S$ contained in said geothermal fluid, and said geothermal fluid comprises at least 1.0 percent by weight of said non-condensable gases.

25. The method of claim 19 wherein said added amount of said sulfurous acid or said sulfur dioxide is controlled so as to not substantially increase the corrosion rate of metal surfaces in contact with said fluid mixture.

26. The method of claim 18 further comprising transferring thermal energy from said fluid mixture across said heat-exchange surface to a second fluid.

27. The method of claim 26 further comprising the step of injecting said fluid mixture into a subterranean reservoir after said thermal energy transfer.

28. The method of claim 18 wherein said fluid mixture comprises:

a high-enthalpy geothermal fluid containing less than a saturated amount of silicon-containing compounds; and hydrogen ions and sulfite and/or bisulfite anions in an amount sufficient to prevent the formation of a silicon-containing precipitate.

29. The method of claim 18 wherein said geothermal fluid comprises liquid water and at least 5 ppmw of hydrogen sulfide gas, calculated as $H_2S$.

30. The method of claim 18 wherein said silicon-containing component is selected from the group consisting of silicic acid, oligomers of silicic acid, polymers containing silicic acid monomers, silicates and silicas.

31. The method of claim 18 wherein said silicon-containing precipitate is selected from the group consisting of magnesium silicate, aluminum silicate and iron silicate.

32. The method of claim 18 wherein said water or said aqueous solution comprises condensate of said steam.

33. The method of claim 18 wherein said high-enthalpy geothermal fluid further comprises calcium carbonate-forming components, and the formation of a calcium carbonate-containing precipitate is inhibited.

34. A method for inhibiting the precipitation of silicon-containing scale from a hot pressurized geothermal fluid having a pH from about 4.0 to about 8.0 and containing dissolved silicon-containing components capable of forming a silicon-containing precipitate when sufficient thermal energy is removed from said geothermal fluid, said method comprising the following steps:

(1) flashing said geothermal fluid to produce steam containing hydrogen sulfide gas and an aqueous liquid brine solution containing said dissolved silicon-containing components;

(2) converting said hydrogen sulfide gas to sulfur dioxide gas;

(3) contacting said aqueous liquid brine solution with sulfurous acid obtained from said sulfur dioxide to form a fluid mixture containing soluble sulfite ions and/or bisulfite ions and silicon-containing components;

(4) flowing said fluid mixture in contact with a surface of a geothermal heat-exchanger to reduce the temperature of said fluid mixture; and (5) flowing said fluid mixture obtained from step (4) into a subterranean reservoir whereby avoiding the formation of a substantial amount of said silicon-containing precipitate prior to contact with a solid surface in said subterranean reservoir.

35. The method of claim 34 wherein said fluid mixture obtained in step (3) has a pH lower than said aqueous liquid brine solution obtained in step (1).

36. The method of claim 35 further comprising adding additional acid to said geothermal fluid and/or to said aqueous liquid brine solution.

37. The method of claim 36 wherein said sulfur dioxide obtained in step (2) is recycled to said geothermal fluid prior to or during step (1).

38. The method of claim 37 wherein said dissolved silicon-containing components are selected from the group consisting of silicic acid, oligomers of silicic acid, polymers of silicic acid monomers, a metal silicate, and silica.

39. The method of claim 38 wherein said acid is selected from the group consisting of sulfuric acid, hydrochloric acid, nitric acid, acetic acid and mixtures thereof.

40. The method of claim 36 wherein said sulfur dioxide obtained in step (2) is further added to said fluid mixture obtained from step (4). aqueous brine solution, said brine-soluble species prepared from said hydrogen sulfide.

41. The method of claim 34 wherein said silicon-containing precipitate is selected from the group consisting of magnesium silicate, aluminum silicate and iron silicate.

42. The method of claim 34 wherein said sulfurous acid is formed from contact of said sulfur dioxide with condensate formed from said steam.

43. The method of claim 34 wherein said hot pressurized geothermal fluid further contains dissolved calcium ions, carbonate ions, heavy metal ions and/or sulfide ions, and said fluid mixture further contains calcium ions, carbonate ions, heavy metal ions and/or sulfide ions.

44. A method for Inhibiting the formation of a silicon-containing precipitate from a geothermal fluid containing an aqueous brine solution having silicon-containing components and hydrogen sulfide, said method comprising:
adding sulfurous acid to said aqueous brine solution prior to passing said aqueous brine solution through a geothermal flash-condensing vessel, said sulfurous acid prepared from said hydrogen sulfide and wherein the pH of said aqueous brine solution containing said sulfurous acid sufficiently lowered to inhibit formation of said silicon-containing precipitate.

45. The method of claim 44 wherein said aqueous brine solution is produced during a process for generating power from said geothermal fluid.

46. The method of claim 45 wherein sulfur dioxide is produced from oxidation of said hydrogen sulfide.

47. The method of claim 46 wherein said hydrogen sulfide is oxidized to free sulfur, and said free sulfur is essentially completely oxidized to said sulfur dioxide.

48. The method of claim 44 further comprising the step of converting sulfur dioxide to sulfurous acid prior to adding said sulfurous acid to said aqueous brine solution.

49. The method of claim 44 wherein said silicon-containing precipitate is selected from the group consisting of magnesium silicate, aluminum silicate and iron silicate.

50. The method of claim 44 wherein said geothermal fluid further contains sulfide ions and/or calcium carbonate-forming components end wherein the formation of sulfide-containing and/or calcium carbonate-containing precipitate is inhibited.

51. A method for maintaining scale-forming species in aqueous solution comprising silicon-containing components, said method comprising:
separating hydrogen-sulfide gas from a geothermal fluid containing an aqueous geothermal brine;
oxidizing said hydrogen sulfide gas to produce a gaseous component comprising sulfur dioxide gas; and
introducing said gaseous component into (1) an aqueous geothermal brine or said geothermal fluid to produce sulfuric acid and to lower the pH of said aqueous geothermal brine or said geothermal fluid, and/or into (2) water or an aqueous solution to produce sulfurous acid, and further introducing said sulfurous acid into said aqueous geothermal brine or said geothermal fluid prior to said geothermal fluid being passed through a geothermal flash-condensing vessel to sufficiently lower the pH of said aqueous geothermal brine to inhibit formation of silicon-containing precipitate.

52. The method of claim 51 wherein said water or aqueous solution is condensed steam.

53. The method of claim 51 wherein said aqueous geothermal brine is formed by flashing said geothermal fluid.

54. The method of claim 51 wherein said gaseous component further comprises sulfur trioxide and sulfuric acid is produced when said gaseous component is introduced into said aqueous geothermal brine, said aqueous geothermal fluid, said water and/or said aqueous solution, and said sulfuric acid introduced into said aqueous geothermal brine or said geothermal fluid prior to said geothermal fluid being passed through said geothermal flash-condensing vessel.

55. A method of operating a geothermal brine power plant for producing electric power, said method comprising:
(a) removing geothermal brine comprising silicon-containing components from one or more production wells drilled into a underground geothermal brine aquifer;
(b) flashing said geothermal brine to a reduced pressure to produce steam and flashed brine;
(c) generating power with said steam and producing steam condensate,
(d) contacting at least some of said steam condensate with sulfur dioxide to form acidic components comprising sulfurous acid; and
(e) injecting at least some of said steam condensate obtained from step (d) into said geothermal brine, and wherein the pH of said geothermal brine is sufficiently lowered to inhibit the formation of silicon-containing precipitate.

56. The method of claim 55 wherein said sulfur dioxide in step (d) is obtained from sulfur-containing species contained in said geothermal brine.

57. The method of claim 55 wherein said steam condensate obtained from step (d) is mixed with at least one acid and injected into said flashed brine or into said geothermal brine.

58. The method of claim 55 wherein sulfurous acid comprises at least 35 weight percent of the sulfur-containing acidic components contained in said steam condensate of step (d), calculated as S.

59. The method of claim 55 wherein said steam produced in step (b) comprises hydrogen sulfide and said hydrogen sulfide is separated from said steam and said sulfur dioxide is obtained from sulfur species derived from said hydrogen sulfide.

60. The method of claim 59 wherein said sulfur species derived from said hydrogen sulfide comprises free sulfur.

61. The method of claim 60 wherein said free sulfur is converted to said sulfur dioxide.

62. The method of claim 60 wherein said free sulfur is converted to sulfur trioxide.

63. A method of operating a geothermal brine power plant for producing electric power, said method comprising:
(a) removing a geothermal fluid containing geothermal brine comprising silicon-containing components and hydrogen sulfide from one or more production wells drilled into a underground geothermal brine acquifer;
(b) flashing said geothermal fluid to a reduced pressure to produce steam, hydrogen sulfide gas and flashed brine;
(c) generating power with said steam and producing steam condensate;
(d) oxidizing said hydrogen sulfide to produce sulfur dioxide;
(e) contacting at least some of said steam condensate with said sulfur dioxide to form an add solution, said acid solution comprising sulfurous acid in a concentration of at least 35 weight percent of the sulfur-containing acidic components contained in saw acid solution, calculated as S; and
(f) injecting at least some of said steam condensate obtained from step (e) into said geothermal fluid and wherein the pH of said geothermal fluids sufficiently lowered to inhibit the formation of silicon-containing precipitate.

* * * * *